US008376124B1

(12) United States Patent
Rosen

(10) Patent No.: US 8,376,124 B1
(45) Date of Patent: Feb. 19, 2013

(54) AUTOMATED CONVEYOR HUMAN TRANSPORT DEEP CLEANING SYSTEM

(75) Inventor: Efraim Rosen, Reading (GB)

(73) Assignee: Rosemor International Ltd., Oxfordshire (GB)

( * ) Notice: Subject to any disclaimer, the term of this patent is extended or adjusted under 35 U.S.C. 154(b) by 0 days.

(21) Appl. No.: 13/246,259

(22) Filed: Sep. 27, 2011

(51) Int. Cl.
*B65G 45/18* (2006.01)

(52) U.S. Cl. ....................................... 198/496; 15/256.5

(58) Field of Classification Search .................. 198/321, 198/333, 494, 496; 15/256.5, 256.53
See application file for complete search history.

(56) References Cited

U.S. PATENT DOCUMENTS

| | | | | |
|---|---|---|---|---|
| 2,617,515 | A * | 11/1952 | Hohnecker | 198/332 |
| 3,678,533 | A * | 7/1972 | Cravits | 15/302 |
| 3,910,400 | A * | 10/1975 | Hishitani | 198/338 |
| 4,514,872 | A * | 5/1985 | Hopkins | 15/256.5 |
| 5,025,527 | A * | 6/1991 | Armstrong | 15/256.5 |
| 5,042,641 | A * | 8/1991 | Soldat | 198/496 |
| 5,117,968 | A * | 6/1992 | Rivera | 198/496 |
| 5,293,985 | A * | 3/1994 | Alvarez | 198/496 |
| 5,671,838 | A * | 9/1997 | Bowman | 198/496 |
| 5,746,302 | A * | 5/1998 | Bowman | 198/496 |
| 5,893,450 | A * | 4/1999 | Metivier | 198/496 |
| 7,232,028 | B2 * | 6/2007 | Schulz | 198/493 |
| 7,389,866 | B2 * | 6/2008 | Kawasaki | 198/335 |

FOREIGN PATENT DOCUMENTS

| | | | |
|---|---|---|---|
| EP | 336896 | * 10/1989 | 198/321 |

* cited by examiner

*Primary Examiner* — James R Bidwell
(74) *Attorney, Agent, or Firm* — Sughrue Mion, PLLC

(57) ABSTRACT

A system for cleaning conveyor human transports including a first plurality of elongate brushes, each extending along a longitudinal axis, at least one drive motor, a second plurality of endless resilient tensionable belts arranged to be driven by the drive motor intermittently in a plurality of planes, generally perpendicular to the longitudinal axes of the first plurality of elongate brushes, a third plurality of brush mounting elements arranged to mount each of the first plurality of elongate brushes onto the second plurality of endless resilient tensionable belts for intermittent motion generally perpendicular to the longitudinal axes of the first plurality of elongate brushes and a tensioning assembly operative to maintain the second plurality of endless resilient tensionable belts under tension at least during the motion.

16 Claims, 8 Drawing Sheets

AUTOMATED CONVEYOR HUMAN TRANSPORT DEEP CLEANING SYSTEM

FIELD OF THE INVENTION

The present invention relates to automated cleaning apparatus generally and more particularly to deep cleaning apparatus for conveyor human transports.

BACKGROUND OF THE INVENTION

The following publications are believed to represent the current state of the art:

Rosemor Brochure issued February, 2011 describing a prior art product of the assignee; and German Patentschrift DE 4437 763 C2 dated Apr. 24, 1997.

SUMMARY OF THE INVENTION

The present invention seeks to provide an improved system for deep cleaning of conveyor human transports.

There is thus provided in accordance with a preferred embodiment of the present invention a system for cleaning conveyor human transports including a first plurality of elongate brushes, each extending along a longitudinal axis, at least one drive motor, a second plurality of endless resilient tensionable belts arranged to be driven by the drive motor intermittently in a plurality of planes, generally perpendicular to the longitudinal axes of the first plurality of elongate brushes, a third plurality of brush mounting elements arranged to mount each of the first plurality of elongate brushes onto the second plurality of endless resilient tensionable belts for intermittent motion generally perpendicular to the longitudinal axes of the first plurality of elongate brushes and a tensioning assembly operative to maintain the second plurality of endless resilient tensionable belts under tension at least during the motion.

Preferably, the system for cleaning conveyor human transports also includes selectably actuable forward and rearward lifting assemblies for providing escalator stair climbing. Additionally or alternatively, the system for cleaning conveyor human transports also includes a vacuum waste collection subsystem.

In accordance with a preferred embodiment of the present invention the second plurality of endless resilient tensionable belts includes a plurality of timing belts. Additionally or alternatively, the at least one drive motor is operative to drive the endless resilient tensionable belts in both a clockwise direction and a counter-clockwise direction.

BRIEF DESCRIPTION OF THE DRAWINGS

The present invention will be understood more fully from the following detailed description, taken in conjunction with the drawings in which.

DETAILED DESCRIPTION OF A PREFERRED EMBODIMENT

Figure 1A:
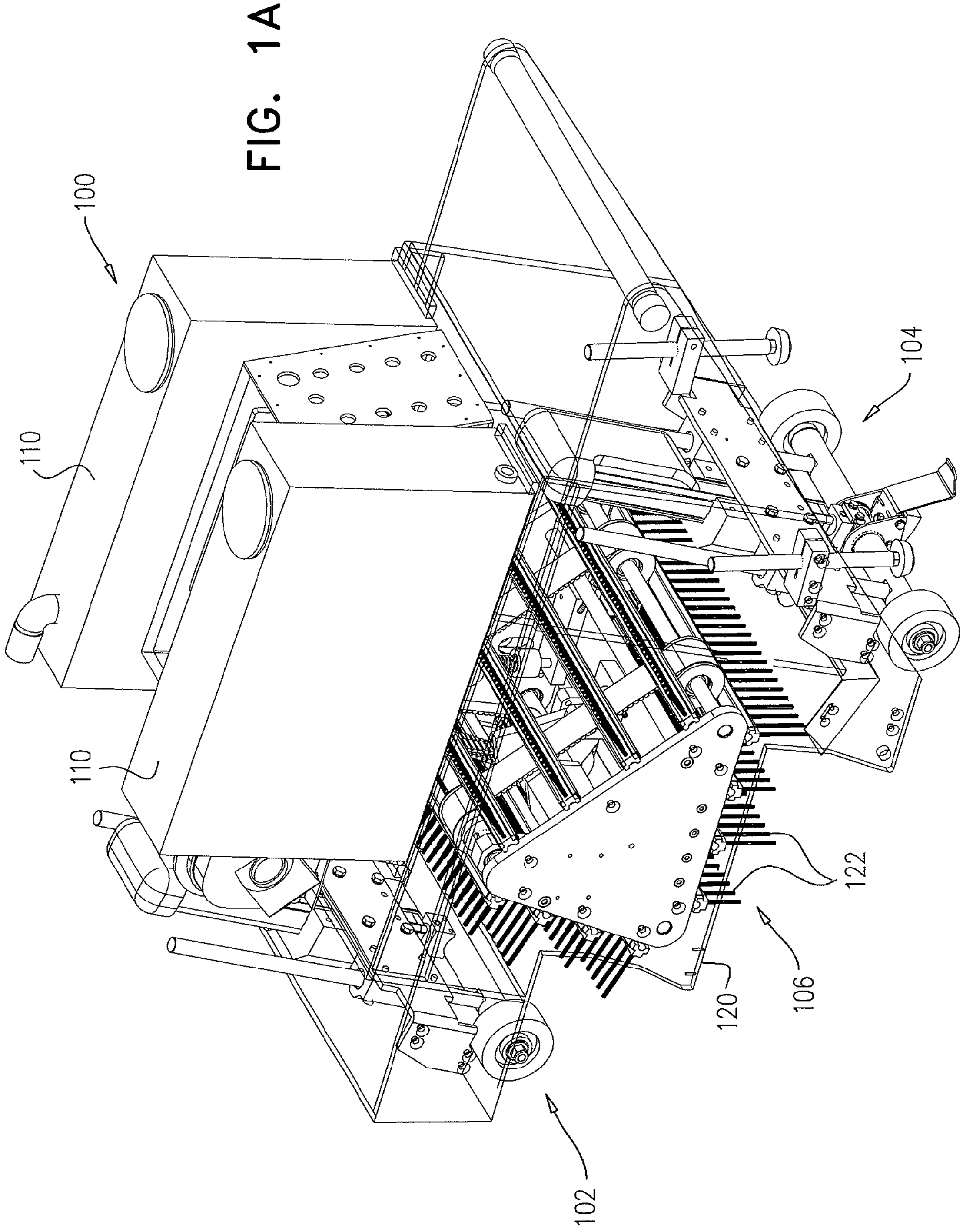
FIGS. 1A and 1B are respective simplified pictorial and schematic illustrations of a system for cleaning conveyor human transports constructed and operative in accordance with a preferred embodiment of the present invention.
Figure 1B:
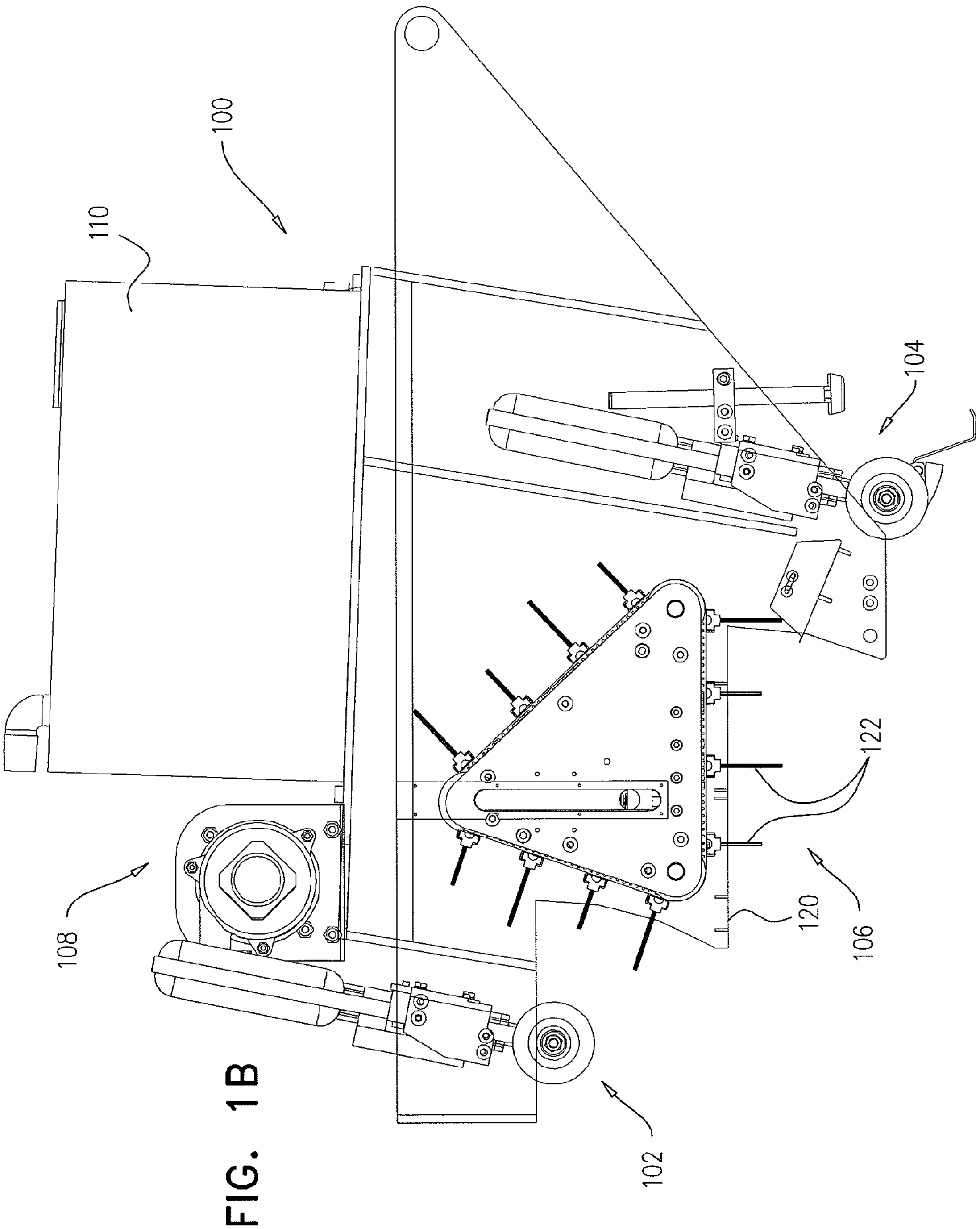

Reference is now made to FIGS. 1A and 1B, which are respective simplified pictorial and schematic illustrations of a system for cleaning conveyor human transports constructed and operative in accordance with a preferred embodiment of the present invention. For the purposes of the present application, the term "conveyor human transports" is defined to include moving stairways, such as escalators, and moving walkways.

The system of FIGS. 1A & 1B preferably includes a first plurality of elongate brushes, each extending along a longitudinal axis, a second plurality of endless resilient, tensionable belts arranged to be driven intermittently in a plurality of planes generally perpendicular to the longitudinal axes of the first plurality of elongate brushes, and a third plurality of brush mounting lugs arranged to mount each of the first plurality of elongate brushes onto the second plurality of endless resilient, tensionable belts for intermittent motion in at least one plane, perpendicular to the plurality of planes in a direction generally perpendicular to the longitudinal axes of the first plurality of elongate brushes. The system preferably also includes a tensioning assembly operative to maintain the second plurality of endless belts under tension at least during the motion.

As seen in FIGS. 1A and 1B, a conveyor human transport cleaning system 100 includes a forward lifting assembly 102 and a rearward lifting assembly 104 for enabling escalator stair climbing. It is appreciated that system 100 may be employed to clean horizontal walkways, in which case lifting assemblies 102 and 104 are obviated.

System 100 also includes a rotating cleaning subsystem 106 and a vacuum waste collection subsystem 108. Cleaning solution tanks 110 are provided for storing a cleaning solution which is used by rotating cleaning subsystem 106. A generally downward stair-stepped surface 120 is provided for close engagement of system 100 with an escalator while being cleaned.

Rotating cleaning subsystem 106 preferably includes a plurality of elongate brushes 122 each extending along a longitudinal axis, which are provided for cleaning the surfaces of the steps of an escalator when rotated by subsystem 106.

Reference is now made to FIGS. 2A, 2B, 2C, 2D, 2E and 2F, which are respective pictorial illustrations of stages in the operation of the system of FIGS. 1A & 1B. A conveyor human transport cleaning system 200 preferably includes a forward lifting assembly 202 and a rearward lifting assembly 204 for providing escalator stair climbing. System 200 also includes a rotating cleaning subsystem 206 and a vacuum waste collection subsystem 208. Cleaning solution tanks 210 are provided for storing a cleaning solution which is used by rotating cleaning subsystem 206. A bottom stair stepped surface 220 is provided for close engagement of system 200 with an escalator while being cleaned.

Rotating cleaning subsystem 206 preferably includes a plurality of elongate brushes 222 each extending along a longitudinal axis, which are provided for cleaning the surfaces of the steps of an escalator when rotated by subsystem 206.

Figure 2B:
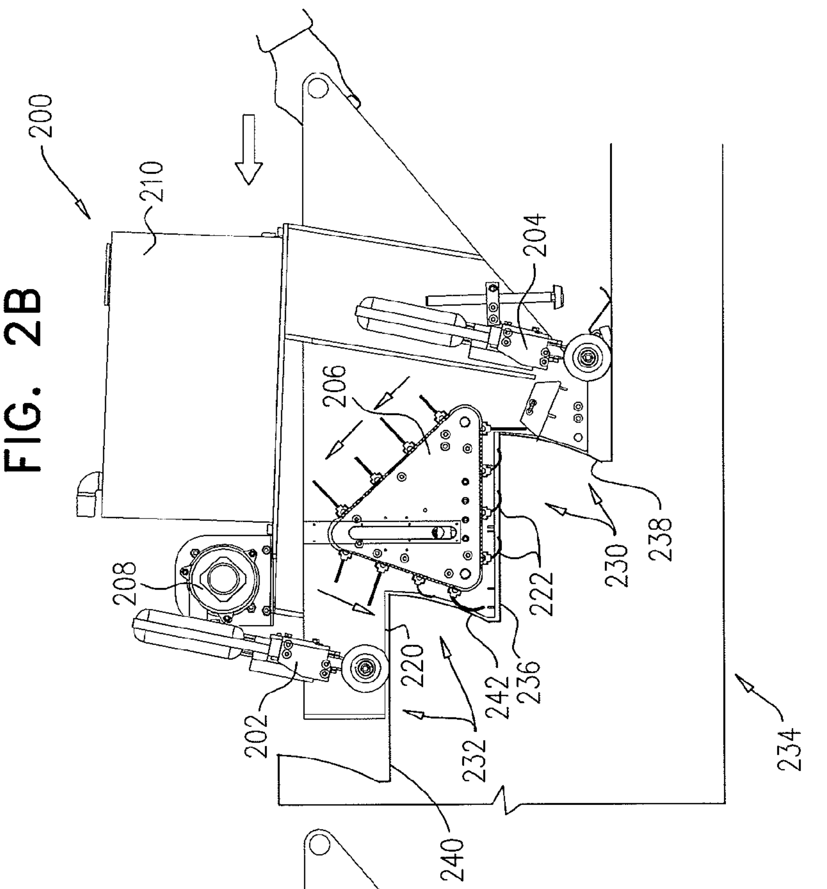
FIGS. 2A, 2B, 2C, 2D, 2E and 2F are respective pictorial illustrations of stages in the operation of the system of FIGS. 1A & 1B.
Figure 2A:
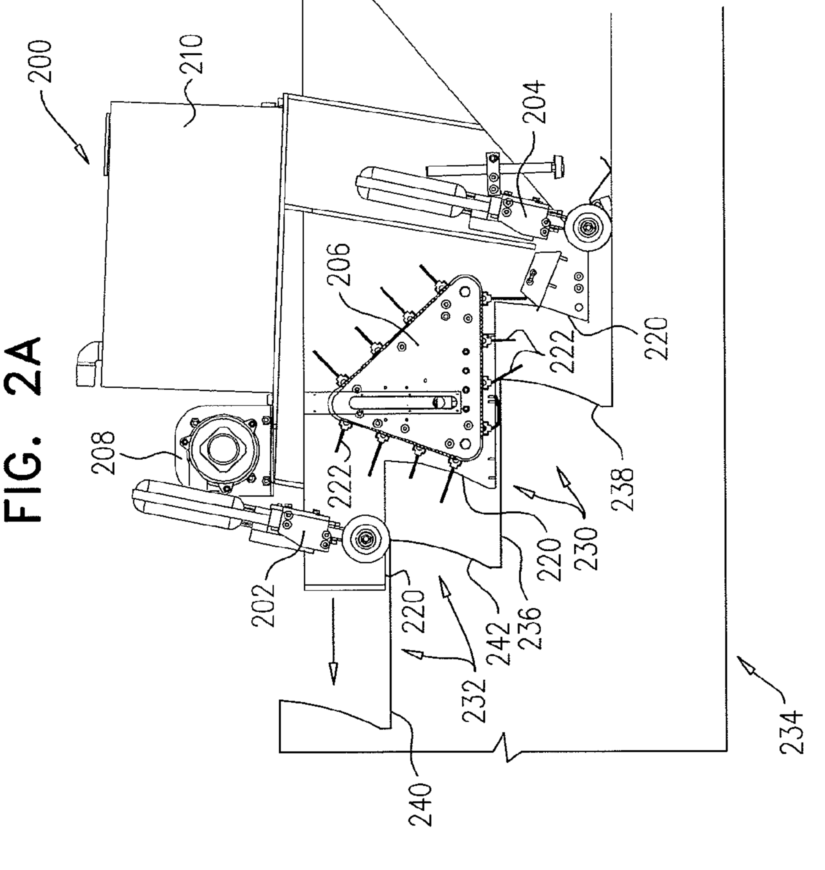

As shown in FIG. 2A, a conveyor human transport cleaning system 200 is initially rolled forward onto two bottommost steps 230 and 232 of an escalator assembly 234, step 230 having a horizontal surface 236 and a generally vertical surface 238 and step 232 having a horizontal surface 240 and a generally vertical surface 242. In the initial stage shown in FIG. 2A, stepped surface 220 first engages with horizontal surfaces 236 and 240.

Turning now to FIG. 2B, it is shown that system 200 is further rolled onto steps 230 and 232, causing stepped surface 220 to engage with generally vertical surfaces 238 and 242. Rotating cleaning subsystem 206 is then employed to rotate brushes 222 in close engagement with surfaces 236 and 242, thereby cleaning horizontal surface 236 of step 230 and vertical surface 242 of step 232.

Figure 2D:
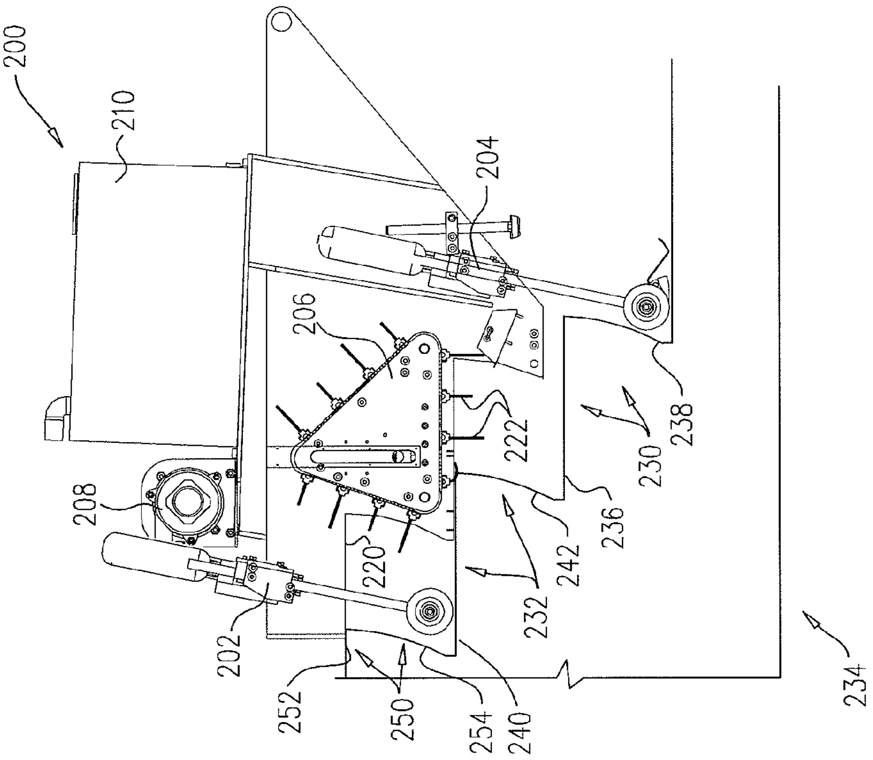
Figure 2C:
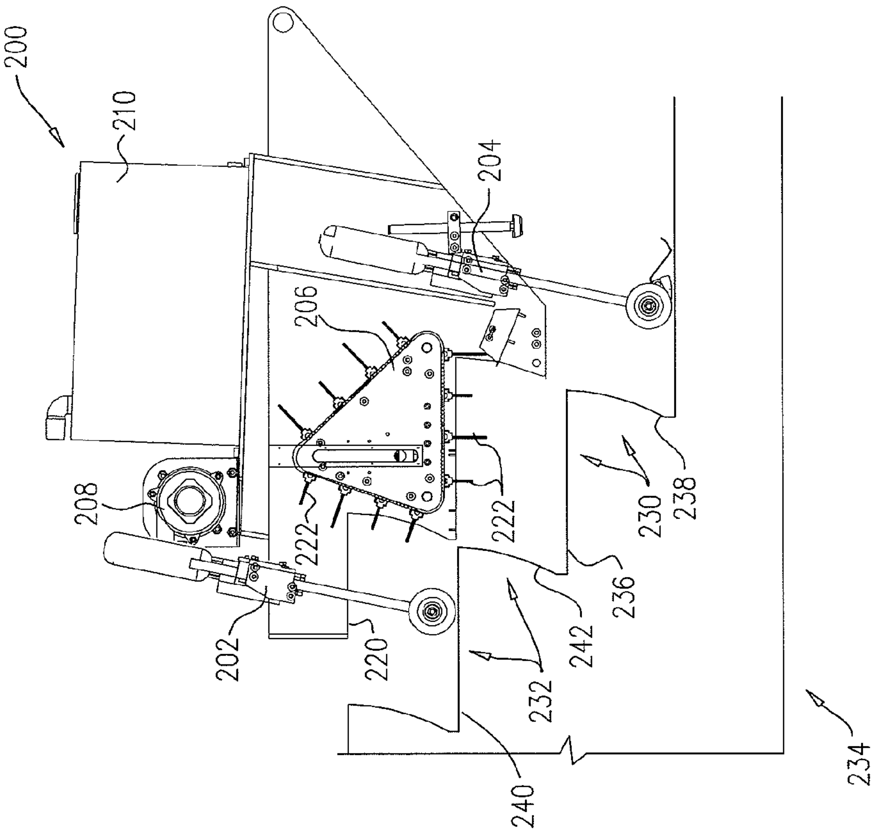

Turning now to FIG. 2C, it is shown that upon completion of cleaning surfaces 236 and 242, forward lifting assembly 202 and rearward lifting assembly 204 are employed to raise system 200 from steps 230 and 232. As shown in FIG. 2D, system 200 is then preferably rolled forward onto step 232 and third bottommost step 250 of escalator assembly 234. Step 250 has a horizontal surface 252 and a generally vertical surface 254. Forward lifting assembly 202 and rearward lifting assembly 204 are then preferably retracted into system 200, thereby enabling system 200 to be further rolled onto steps 232 and 250, as shown in FIG. 2E.

Figure 2F:
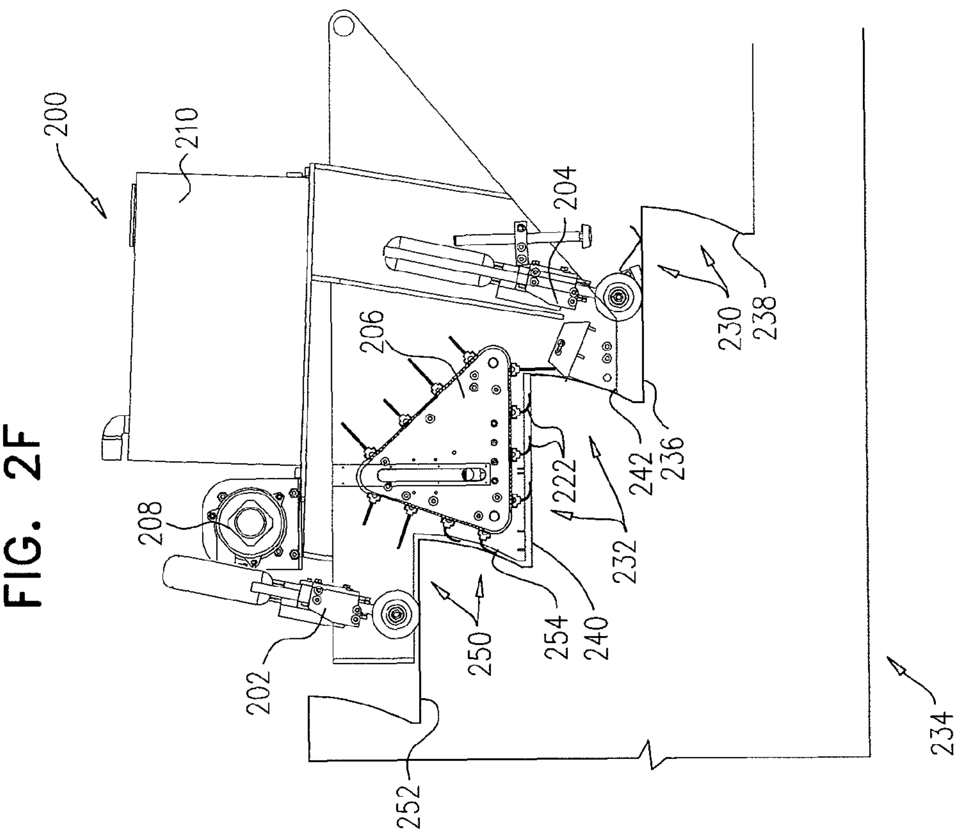
Figure 2E:
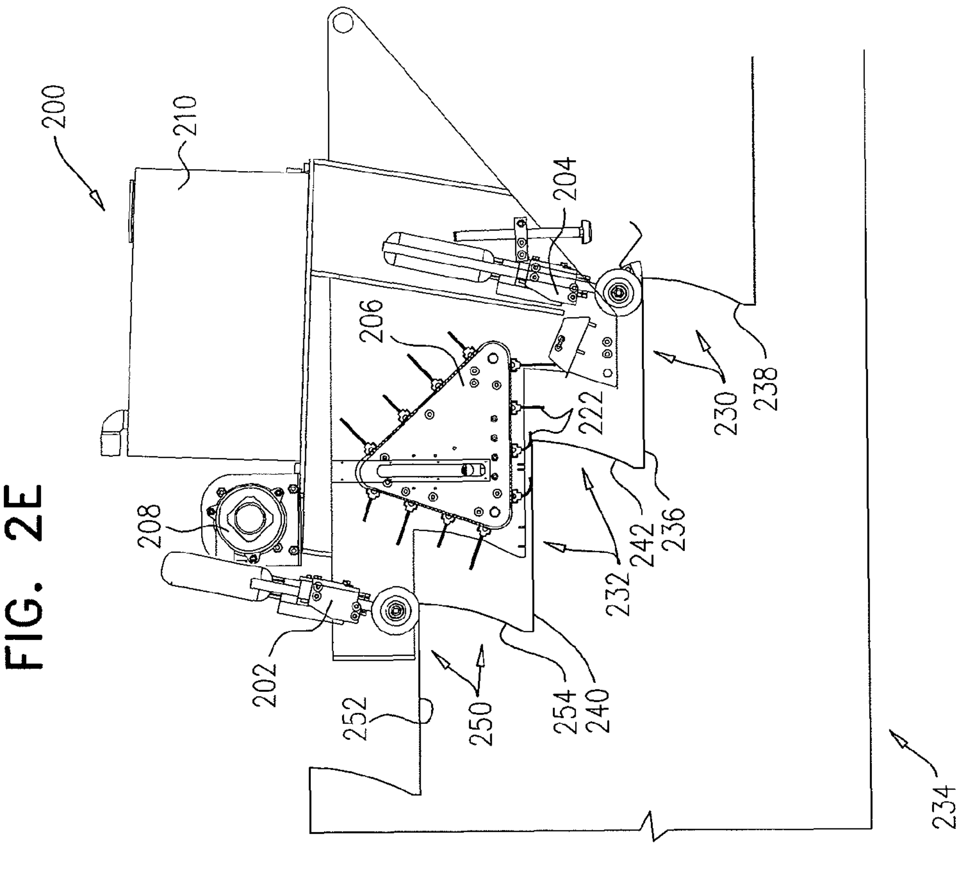

Turning now to FIG. 2F, it is shown that system 200 is yet further rolled onto steps 232 and 250, causing stepped surface 220 to engage with generally vertical surfaces 242 of step 232 and 254 of step 250. Rotating cleaning subsystem 206 is then employed to rotate brushes 222 in close engagement with surfaces 240 and 254, thereby cleaning surfaces 240 and 254. It is appreciated that the stages in the operation of system 200 illustrated in FIGS. 2A-2F constitute a complete cycle of cleaning both the horizontal and vertical surfaces of one step of an escalator, as well as a horizontal surface of a next lower step and a vertical surface of a next higher step, and positioning system 200 on the next higher step.

Figure 3A:
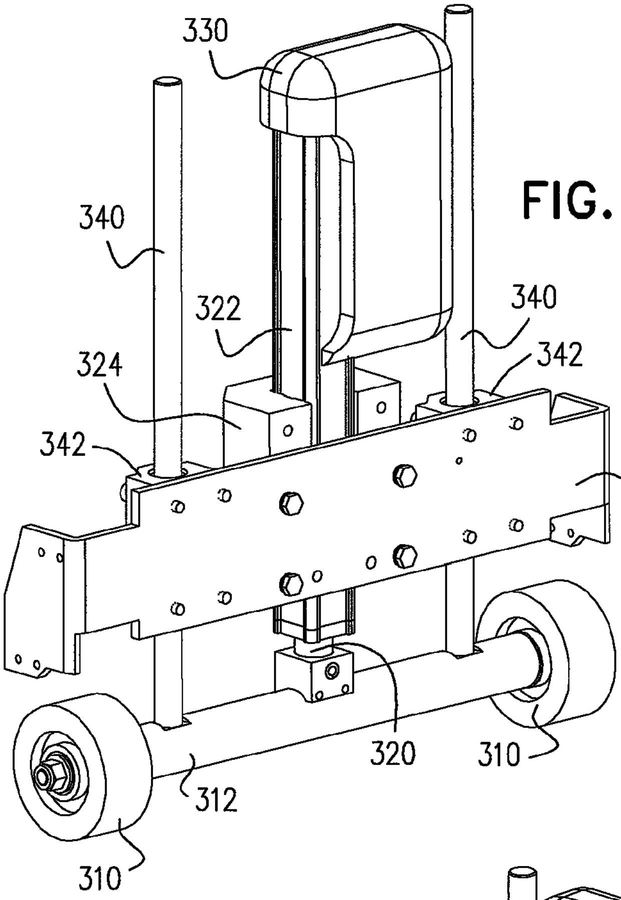
FIGS. 3A and 3B are simplified rearward facing and forward facing pictorial illustrations of a forward lifting mechanism of the system of FIGS. 1A & 1B.
Figure 3B:
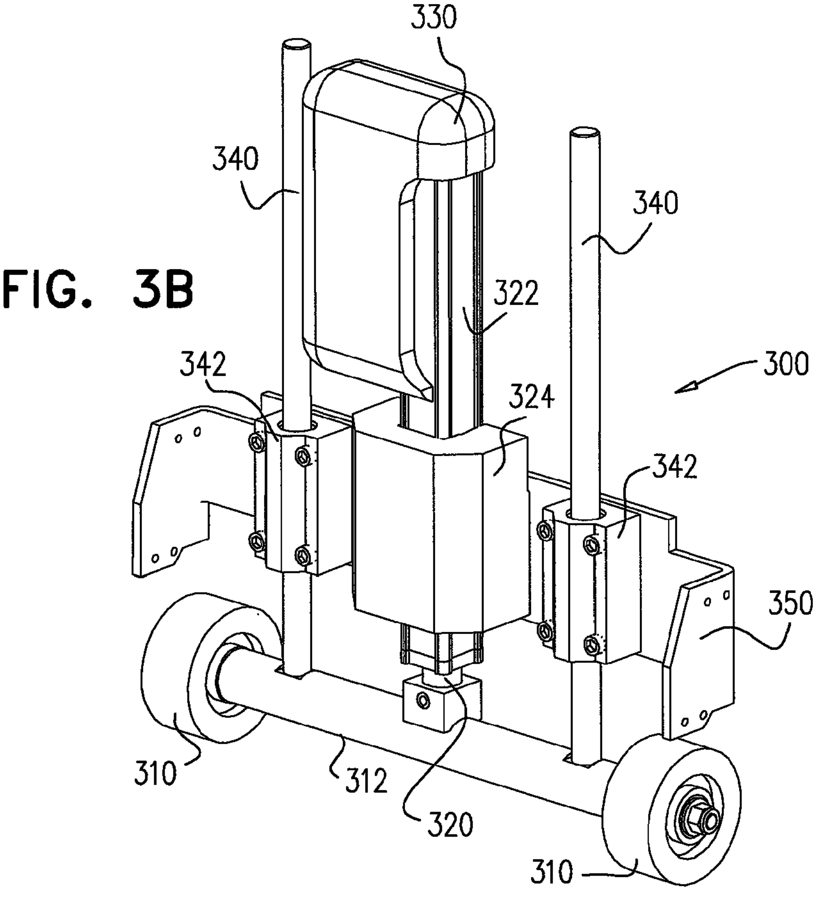

Reference is now made to FIGS. 3A and 3B, which are simplified rearward facing and forward facing pictorial illustrations of a forward lifting mechanism of the system of FIGS. 1A & 1B. As shown in FIGS. 3A and 3B, the forward lifting mechanism 300 includes two engagement wheels 310 which are mounted on a horizontal axle 312. Axle 312 is preferably connected to a vertical extending rod 320 which is housed in a vertical rod housing element 322. Vertical rod housing element 322 is preferably housed in a main housing element 324. An actuator element 330 is preferably provided for extending and retracting rod 320 within housing element 322, and is thereby operative to extend and retract axle 312 together with wheels 310 mounted thereupon.

Two guiding rods 340 are connected to axle 312 and are vertically threaded through guides 342. A horizontal brace 350 is provided for mounting main housing element 324 and guides 342 in a mutually generally horizontal arrangement. It is appreciated that the generally horizontal arrangement of guides 342 and element 324 together with the threading of rods 340 through guides 342 is operable for maintaining rod 320 generally horizontally aligned with brace 350.

Figure 4A:
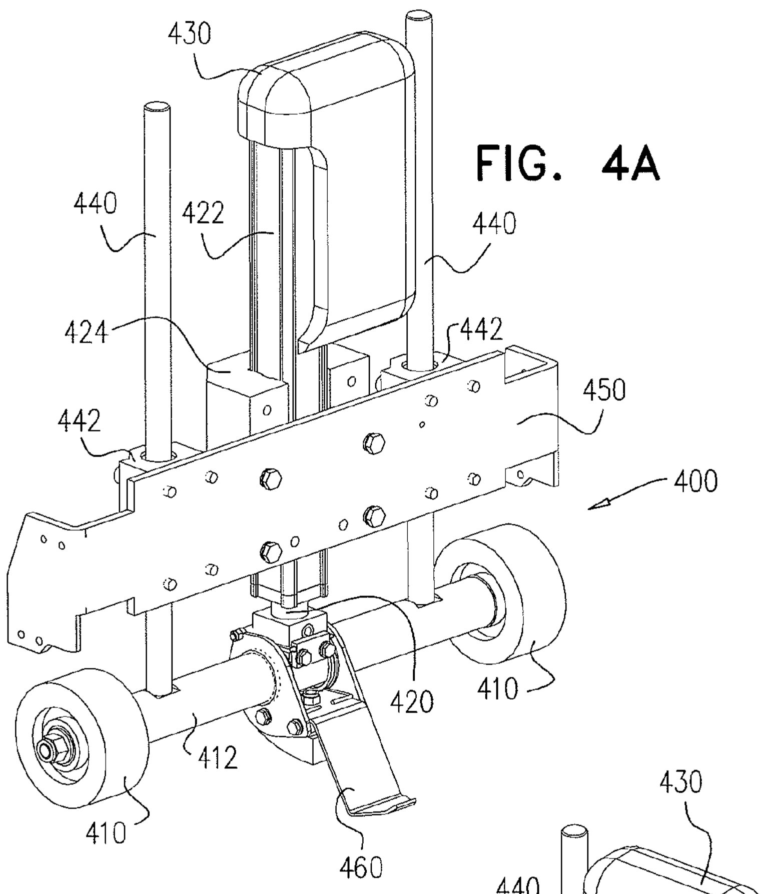
FIGS. 4A and 4B are simplified rearward facing and forward facing pictorial illustrations of a rearward lifting mechanism of the system of FIGS. 1A & 1B.
Figure 4B:
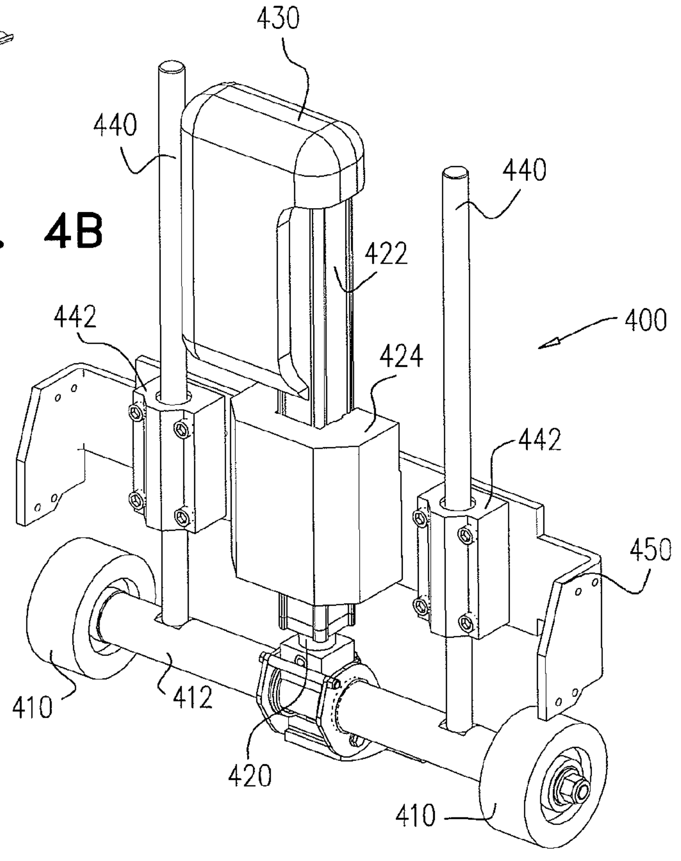

Reference is now made to FIGS. 4A and 4B, which are simplified rearward facing and forward facing pictorial illustrations of a rearward lifting mechanism of the system of FIGS. 1A & 1B. As shown in FIGS. 4A and 4B, the rearward lifting mechanism 400 includes two engagement wheels 410 which are mounted on a horizontal axle 412. Axle 412 is preferably connected to a vertical extending rod 420 which is housed in a vertical rod housing element 422. Vertical rod housing element 422 is preferably housed in a main housing element 424. An actuator element 430 is preferably provided for extending and retracting rod 420 within housing element 422, and is thereby operative to extend and retract axle 412 together with wheels 410 mounted thereupon.

Two guiding rods 440 are connected to axle 412 and are vertically threaded through guides 442. A horizontal brace 450 is provided for mounting main housing element 424 and guides 442 in a mutually generally horizontal arrangement. It is appreciated that the generally horizontal arrangement of guides 442 and element 424 together with the threading of rods 440 through guides 442 is operable for maintaining rod 420 generally horizontally aligned with brace 450.

A lockable brake element 460 is preferably provided for preventing the system from rolling rearwardly while engaged with an escalator.

Figure 5:
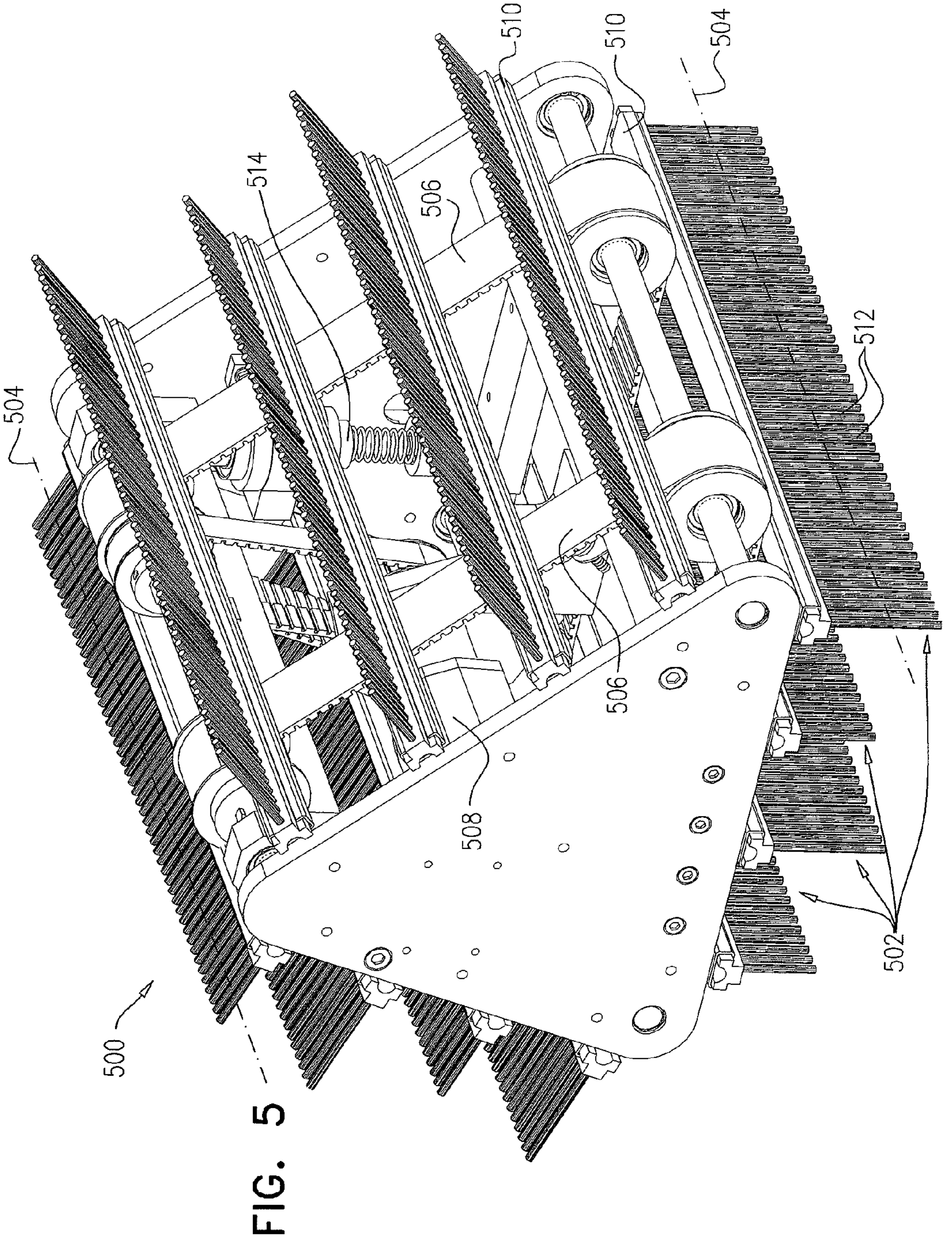
FIG. 5 is a simplified pictorial illustration of a cleaning subsystem which is part of the system of FIGS. 1A & 1B.

Reference is now made to FIG. 5, which is a simplified pictorial illustration of a cleaning subsystem which is part of the system of FIGS. 1A & 1B. As shown in FIG. 5, rotating cleaning subsystem 500 preferably includes a plurality of elongate brushes 502, each extending along a longitudinal axis 504. Brushes 502 are each mounted onto a pair of endless resilient tensionable belts 506. It is a particular feature of the present invention that belts 506 are resilient and tensionable. Preferred belts 506 are timing belts. A most preferred belt is an Optibelt Alpha linear model AT10, commercially available from Optibelt GmbH of Hoxter, Germany.

Belts 506 are arranged to be driven intermittently by a drive motor 508, in a plurality of planes, generally perpendicular to axes 504 of elongate brushes 502. A plurality of brush mounting elements 510 are preferably provided for replaceable, secure mounting each of brushes 502 onto belts 506 for intermittent motion in directions generally perpendicular to axes 504.

It is appreciated that belts 506 and brushes 502 may be arranged to be driven in both a clockwise and a counter-clockwise direction to provide bi-directional cleaning of conveyor human transport step surfaces.

Brushes 502 preferably include a plurality of resilient portions 512 formed of a material such as plastic. Portions 512 are typically of a width which generally corresponds to the typical width of the grooves of a conveyor human transport step.

The system preferably also includes a tensioning assembly 514, operative to maintain belts 506 under desired tension at least during motion thereof.

It will be appreciated by persons skilled in the art that the present invention is not limited by what has been particularly shown and described hereinabove. Rather the scope of the present invention includes both combinations and subcombinations of the various features described hereinabove as well as modifications thereof which would occur to persons skilled in the art upon reading the foregoing description and which are not in the prior art.

The invention claimed is:

1. A system for cleaning conveyor human transports comprising:

a first plurality of elongate brushes, each extending along a longitudinal axis;

at least one drive motor;

a second plurality of endless resilient tensionable belts arranged to be driven by said drive motor intermittently in a plurality of planes, generally perpendicular to the longitudinal axes of said first plurality of elongate brushes;

a third plurality of brush mounting elements arranged to mount each of said first plurality of elongate brushes onto said second plurality of endless resilient tensionable belts for intermittent motion generally perpendicular to said longitudinal axes of said first plurality of elongate brushes; and a tensioning assembly operative to maintain said second plurality of endless resilient tensionable belts under tension at least during said motion.

2. A system for cleaning conveyor human transports according to claim 1 and also comprising selectably actuable forward and rearward lifting assemblies for providing escalator stair climbing.

3. A system for cleaning conveyor human transports according to claim 2 and also comprising a vacuum waste collection subsystem.

4. A system for cleaning conveyor human transports according to claim 3 and wherein said second plurality of endless resilient tensionable belts comprises a plurality of timing belts.

5. A system for cleaning conveyor human transports according to claim 4 and wherein said at least one drive motor is operative to drive said endless resilient tensionable belts in both a clockwise direction and a counter-clockwise direction.

6. A system for cleaning conveyor human transports according to claim 3 and wherein said at least one drive motor is operative to drive said endless resilient tensionable belts in both a clockwise direction and a counter-clockwise direction.

7. A system for cleaning conveyor human transports according to claim 2 and wherein said second plurality of endless resilient tensionable belts comprises a plurality of timing belts.

8. A system for cleaning conveyor human transports according to claim 7 and wherein said at least one drive motor is operative to drive said endless resilient tensionable belts in both a clockwise direction and a counter-clockwise direction.

9. A system for cleaning conveyor human transports according to claim 2 and wherein said at least one drive motor is operative to drive said endless resilient tensionable belts in both a clockwise direction and a counter-clockwise direction.

10. A system for cleaning conveyor human transports according to claim 1 and also comprising a vacuum waste collection subsystem.

11. A system for cleaning conveyor human transports according to claim 10 and wherein said second plurality of endless resilient tensionable belts comprises a plurality of timing belts.

12. A system for cleaning conveyor human transports according to claim 11 and wherein said at least one drive motor is operative to drive said endless resilient tensionable belts in both a clockwise direction and a counter-clockwise direction.

13. A system for cleaning conveyor human transports according to claim 11 and wherein said at least one drive motor is operative to drive said endless resilient tensionable belts in both a clockwise direction and a counter-clockwise direction.

14. A system for cleaning conveyor human transports according to claim 1 and wherein said second plurality of endless resilient tensionable belts comprises a plurality of timing belts.

15. A system for cleaning conveyor human transports according to claim 14 and wherein said at least one drive motor is operative to drive said endless resilient tensionable belts in both a clockwise direction and a counter-clockwise direction.

16. A system for cleaning conveyor human transports according to claim 1 and wherein said at least one drive motor is operative to drive said endless resilient tensionable belts in both a clockwise direction and a counter-clockwise direction.

* * * * *